May 28, 1935.  C. E. HATHORN  2,002,944
ACCESS OPENING FOR USE IN AIRCRAFT CONSTRUCTION
Filed July 15, 1932
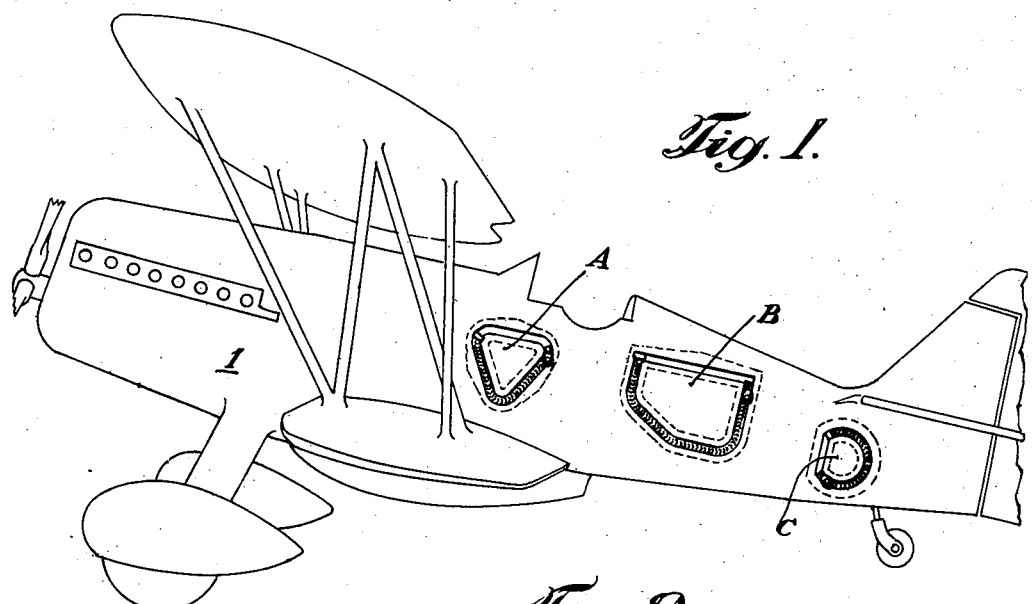
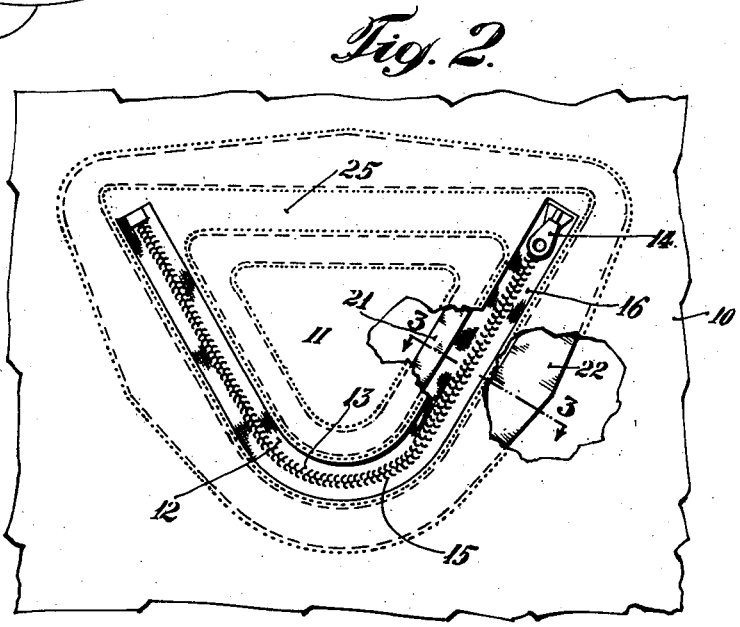
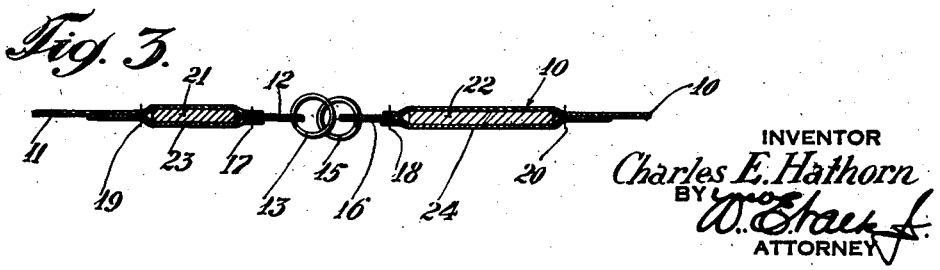
INVENTOR
Charles E. Hathorn
BY
ATTORNEY Patented May 28, 1935

2,002,944

UNITED STATES PATENT OFFICE 2,002,944

ACCESS OPENING FOR USE IN AIRCRAFT CONSTRUCTION

Charles E. Hathorn, Hempstead, N. Y., assignor to Curtiss Aeroplane & Motor Company, Inc., a corporation of New York Application July 15, 1932, Serial No. 622,633

5 Claims. (Cl. 244—31)

The present invention relates generally to access openings for use in aircraft construction and more specifically to an improvement in the manner of constructing such an opening so as to permit the use of slide fasteners in connection therewith.

It is essential that certain openings be embodied in the surfaces of an aircraft, as in the sides of the fuselage or wings of a heavier-than-air machine, to allow convenient access to mail, baggage and other compartments or equipment. Inspection doors and hand hole openings become a necessity wherever periodical inspection and maintenance of particular localities or parts of an aircraft structure are required. Since these openings are necessarily of various shapes and sizes and are located in different parts of the fuselage or wing covering which are seldom of the same shape or curvature, the merit in an adaptation of some standard, readily operated, fastening device to all such openings regardless of their size, shape or location has been previously recognized, and as a result several unsuccessful attempts have been made to utilize the well known continuous sliding type of fastener as such a closure. All of these prior structures, however, have been abandoned due to specific failures which, in most cases, have been attributed to the inability of this type of fastener to withstand the stress imposed upon it under conditions of service to which it has been subjected. This has been particularly true whenever an attempt has been made to use this type of fastening device in connection with a fabric door in a fabric covered fuselage or other body.

There has apparently been an entire lack of appreciation on the part of prior inventors of the fact that the real reason underlying their failures has resided not in any weakness of the fastening device, but in a characteristic of the fabric covering itself which they have neglected to take into account, namely, that a dope impregnated fabric cover shrinks very appreciably after it has been applied to the fuselage, or other framework, so that it tightens to such an extent that eventually the fasteners are pulled apart or become broken and inoperative. In this connection it should be noted that when laced or any other type of fabric doors are allowed to remain open for any length of time, it is practically impossible to completely close them again due to the shrinkage of the fabric. It has also been customary to paint the webbing of the fastener to match the color of the fuselage cover without realizing that the flexibility required for successful operation of the fastener was thereby destroyed and the hooks of the fastening device either become seriously damaged or actually pulled out of the webbing material.

It is therefore an object of the present invention to provide a door in the cover of an airplane fuselage or other body which may be readily opened or closed by means of a slide fastener.

Another object of the invention resides in the provision of a door in the cover of an airplane fuselage adapted to be readily opened or closed by means of a single continuous slide fastener which may comprise either a curved, or a straight, or a combination of both curved and straight sections depending upon the shape of the opening closed by the door.

It is also an object of the present invention to provide a door of practically any size or shape in the cover of an airplane fuselage, adapted to be opened or closed by means of one or more slide fasteners, in which the operation of the fasteners will not be affected by the tightening or shrinkage of the fabric cover of the fuselage.

A further object of my invention is to provide a framing of metal or other material secured to and so positioned with respect to the edges of the door and to the edges of the opening in the fabric fuselage cover as to render it practicable to use a single fastener for closing the opening, whether the opening be triangular, circular, semi-circular, rectangular with curved corners, or of any other shape.

Another object of the present invention is to adapt such a framing to the door and to the sides of the opening, designed to be closed by the door by means of a slide fastener, which may either be curved or straight, in such a manner that the door will be flush or nearly so with the surrounding cover when in a closed position.

Still a further object of my invention is to shape each of such frame members in the form of a truss so that a strength to weight ratio of the same will be consistent with the requirements of aircraft construction and with the use which is to be made of such parts. In case the frames are formed by stamping from the same piece of metal or other material, the inner frame may be made from the waste of the center of the outer frame resulting in low cost of manufacture. No waste occurs because practically all of the material is utilized.

Other not less important objects such as the manner of assembling the unit and of sewing the frame to the door and to the fuselage covering material, will appear from the following specification in which an acceptable embodiment of my invention is fully described, claimed and illustrated by way of an example only, it being understood that the invention is susceptible of modification in accordance with suggestions herein contained and within the scope of appended claims.

In the drawing:

Fig. 1 of the drawing shows my invention applied to various types of openings in the side of an airplane fuselage;

Fig. 2 is a plan view of the triangular form of the device shown in Fig. 1, the door being in closed position;

Fig. 3 is a cross-sectional view taken on line 3—3 of Fig. 2.

Referring more specifically to the drawing, in which similar characters of reference indicate corresponding parts in all the views, Fig. 1 is a view in elevation of an airplane 1 of conventional bi-plane type showing three openings of different sizes and shapes in the sides of the fuselage thereof, each of such openings being provided with a door constructed in accordance with my invention. At the side of the cockpit is located a triangular-shaped modification of my invention, shown at A, as for the purpose of providing access to a particular part of the fuselage for inspection or repair. B represents another adaptation of my invention to a larger type of opening which may be rectangular with rounded corners or of other shape such as the door to a baggage compartment, whereas C shows an approximately semi-circular opening located at the rear of the fuselage near the empennage of the airplane in connection with which the invention may be utilized to advantage.

As stated above, it has heretofore not been possible to make use of a slide fastener as a closure in an installation wherein the door and the body covering are of the same material, such as the fabric covering material of an airplane fuselage, for the reason that the doped fabric shrinks to such an extent that the fasteners either fail or become inoperative. This would obviously be the case also whenever doped fabric or other material having similar characteristics dependent upon temperature or weather conditions is used either for the door or for the covering of the fuselage. In the present invention, this fault is overcome, and such an installation and use is made entirely practical and desirable, by the utilization of light weight frames secured both to the door and to the edges of the covering as shown in detail in Figs. 2 and 3 of the drawing, which illustrate for purposes of description the triangular-shaped opening A, it being understood that the principles and features of construction comprehended by the invention are equally as applicable to openings of the type of B and C as well as to other openings of various sizes and shapes and for different purposes as may occur to a person skilled in the art from reading this specification.

In Figs. 2 and 3, the fuselage or other body covering 10 is cut out to form a door 11, to the edges of which is secured a web 12 which carries one-half of the spoons or equivalent devices 13 of the slide fastener 14. The other half 15 of the fastening device, both halves of which may be in the form of suitably shaped coiled springs as shown at 13 and 15 in Fig. 3, is carried by a web 16 which is secured to the edges of the opening in the covering material 10 in such a relative position to the device 13 that movement of the slide fastener 14 will open or close the device in a well known manner depending upon the direction of movement imparted to the member 14. When it is desired to use the invention in connection with a fabric body covering, the webs 12 and 16 may be sewed directly to the covering and to the door by stitches as shown at 17 and 18. Inasmuch as other, possibly more convenient and economical methods of securing the parts together are already well known to the art, I do not wish to be limited to the method disclosed, the same being set forth herein merely as a method which is acceptable when the invention is used in connection with fabric covering material.

The invention contemplates the use of inner and outer frame members 21 and 22, preferably constructed of light weight metal such as aluminum or alloys, held in place in pockets formed between the fabric 10 and the fabric forming the door 11 by fabric strips 23 and 24 sewed directly to the door and to the edges of the opening by the same stitches 17 and 18 as secure the webs 12 and 16 to the door and to the covering material respectively, and by the stitches 19 and 20 extending around the inside and outside of the frames. These metal frames which are so formed as to correspond with the shape of the opening, are rigid enough to prevent any distortion either of the door or of the opening due to tightening or other change in the doped fabric or other covering material. In the drawing the larger or outer frame member 22 is shown as truss-shaped which adds stiffness to the frame and allows the same to be constructed of a lighter weight material, or of smaller weight proportions, either of which tends to lighten the structure which is of advantage in all types of aircraft construction. It is essential that neither of the webs 12 or 16 be doped or otherwise treated or painted so that the flexibility necessary for proper functioning of the fastener will not be impaired. This is made possible due to the fact that the frame members are rigid enough to prevent any appreciable stress on the fasteners tending to pull them apart.

The operation of the device is the same regardless of the shape of the opening. To open the door it is necessary only to grasp the tab of the slide fastener 14 and to pull the same around the outline of the opening. The reverse process closes the door. If one fastener only is used the corners between the straight sides of the door are rounded as shown so that the fastener may travel around them, but this fact does not in any sense limit the application of the invention for in the modification shown the angle between the sides of the triangular type of opening is 60 degrees or less which provides ample clearance in any space in which such an opening would be used.

Two or more fasteners may be used as desired or as may become necessary to meet requirements. The frame structure will be the same without regard to the number of the fastening devices used for closure purposes so that the shape of the door will correspond to that of the opening. This is an important feature of the invention, as all covering materials are more or less subject to changes due to variable temperature, conditions of operation or to weather, and as stated above it becomes essential whenever doped fabric is used.

The section of fabric joining the door with the covering material between the inner and outer frames which has not been cut away serves as a hinge about which the door may be opened or closed. This section indicated at 25 in Fig. 2 of the drawing may be reinforced if desired in the case of a much used opening. As previously set forth herein, both the door and the fastening device when in closed position, are flush or nearly so with the surrounding covering material so that no additional parasite resistance is introduced by virtue of the presence of the opening wherever it may be located.

Having described an acceptable embodiment of my invention, I wish it to be understood that I do not desire to be limited to the exact details shown and described, for as previously pointed out modifications coming within the scope of the appended claims will be apparent and will occur to persons skilled in the art to which the invention appertains.

I claim as my invention:

1. In an airplane, a fabric covering having an access opening therein, a slide fastening device for closing said opening, flexible webs securing said fastening device to the opposite edges of said opening, a rigid metal frame secured to the fabric on one side of said opening, and a second metal frame secured to the fabric on the other side of said opening, the said frames preventing the occurrence of stresses due to shrinkage of the fabric tending to pull the fastening device apart.

2. In an airplane, a fabric covering having an access opening therein of such shape that a portion of the covering forms a door adapted to close such opening, a slide fastening device for maintaining the door so formed in closed position, flexible webs securing said fastening device to the opposite edges of said opening, a rigid metal frame secured to the fabric on one side of said opening, and a second rigid metal frame secured to the fabric on the other side of said opening, the said frames preventing the occurrence of stresses due to shrinkage of the fabric tending to pull the fastening device apart.

3. In an airplane, a fabric covering having an access opening therein, a slide fastening device for closing said opening, flexible webs securing said fastening device to the opposite edges of said opening, a rigid metal frame secured to the fabric on one side of said opening, and a second rigid metal frame secured to the fabric on the other side of said opening, the said frames being truss-shaped to provide such a support for said covering that the flexibility of the webs of said slide fastening device is not impaired by shrinkage of the fabric covering.

4. In an airplane, a fabric covering having an opening therein, a door for closing said opening, a slide fastening device for maintaining said door in closed position, a flexible web securing one side of said fastening device to the edges of said opening, a flexible web similarly securing the other side of said device to the edges of said door, a rigid metal frame secured to said covering around said opening, and means for supporting said door in such a manner relative to said opening as to prevent any stress on the fastening device due to shrinkage of the fabric covering.

5. In an airplane, a fabric covering having an access opening therein of such shape that a portion of the covering forms a door adapted to close such opening, a slide fastening device for maintaining the door so formed in closed position, a flexible web securing one side of said fastening device to the edges of said opening, and the other side of said device being similarly secured to the edges of said door, a rigid metal frame secured to said covering around said opening, and a second rigid metal frame secured to said door adjacent the edges thereof, the said frames being one within the other when said door is in closed position.

CHARLES E. HATHORN.